United States Patent [19]

Smith et al.

[11] 4,016,745

[45] Apr. 12, 1977

[54] MONITORING ELECTRICAL APPARATUS AGAINST OVERHEATING BY THE USE OF COATING COMPOSITIONS CONTAINING THERMOPARTICULATABLE DIAZONIUM SALTS

[75] Inventors: James D. B. Smith, Turtle Creek; David C. Phillips, Pittsburgh, both of Pa.

[73] Assignee: Westinghouse Electric Corporation, Pittsburgh, Pa.

[22] Filed: June 1, 1976

[21] Appl. No.: 691,682

Related U.S. Application Data

[62] Division of Ser. No. 568,224, April 15, 1975, Pat. No. 3,979,353.

[52] U.S. Cl. .............................. 73/19; 260/2 EP; 260/2.5 EP; 260/32.8 EP; 260/33.2 EP; 260/33.4 EP; 260/33.6 EP; 260/37 EP; 260/141; 260/142

[51] Int. Cl.² ................... C08K 5/01; C08L 63/00; G01N 7/00

[58] Field of Search .............. 73/19, 23; 260/2 EP, 260/2.5 EP, 37 EP, 141 AN, 142, 33.6 EP

[56] References Cited

UNITED STATES PATENTS

| | | | |
|---|---|---|---|
| 1,999,723 | 4/1935 | Flett | 260/142 |
| 2,658,876 | 11/1953 | Reynolds | 260/141 AN |
| 2,828,300 | 3/1958 | von Glahn | 260/141 AN |
| 3,257,841 | 6/1966 | Lawrence | 73/19 |
| 3,332,936 | 7/1967 | Diekmann | 260/141 AN |
| 3,427,880 | 2/1969 | Grobel et al. | 340/237 |
| 3,705,117 | 12/1972 | Vargiu | 260/33.6 EP |
| 3,978,397 | 8/1976 | Burry et al. | 73/23 |

*Primary Examiner*—Melvyn I. Marquis
*Assistant Examiner*—H. H. Fletcher
*Attorney, Agent, or Firm*—R. D. Fuerle

[57] ABSTRACT

A composition is disclosed of a diazonium salt, a resinous carrier, and a solvent. The composition is applied to a portion of an electrical apparatus which is exposed to a gas stream. The solvent in the composition is evaporated to produce a thermoparticulating coating. When the electrical apparatus overheats the diazonium salt in the coating forms particles in the gas stream which are detected by a monitor.

34 Claims, No Drawings

MONITORING ELECTRICAL APPARATUS AGAINST OVERHEATING BY THE USE OF COATING COMPOSITIONS CONTAINING THERMOPARTICULATABLE DIAZONIUM SALTS

REFERENCES TO RELATED APPLICATIONS

This is a division of application Ser. No. 568,224, filed Apr. 15, 1975, now U.S. Pat. No. 3,979,353.

This application is related to application Ser. No. 426,391 filed Dec. 19, 1973 by Emil M. Fort, Thomas D. Kaczmarek, and David Colin Phillips titled "Sampling System for Power Generators."

This application is also related to application Ser. No. 568,221, filed of Apr. 15, 1975 by J. D. B. Smith and D. C. Phillips titled "Metal Acetyl Acetonate Composition For Forming Thermoparticulating Coating."

This application is related to application Ser. No. 568,222, filed of Apr. 15, 1975 by J. D. Smith, J. F. Meier, and D. C. Phillips, titled "Blocked Isocyanate Composition For Forming Thermoparticulating Coating."

This application is related to application Ser. No. 390,284 filed Aug. 21, 1973 by J. D. B. Smith and D. C. Phillips titled "Malonic Acid Composition For Forming Thermoparticulating Coating."

This application is related to application Ser. No. 568,219 filed of Apr. 15, 1975 by J. D. B. Smith and D. C. Phillips titled "Malonic Acid Derivatives Composition For Forming Thermoparticulating Coating."

This application is related to application Ser. No. 568,223 filed of Apr. 15, 1975 by J. D. B. Smith, and D. C. Phillips and K. W. Grossett titled "Grease Thermoparticulating Coating."

This application is related to application Ser. No. 568,218 filed of Apr. 15, 1975 by D. C. Phillips, W. M. Hickam, and J. D. B. Smith titled "Multiple Signal Thermoparticulating Coating."

BACKGROUND OF THE INVENTION

Electrical apparatus, such as motors and turbine generators, occasionally overheat due to shorts or other malfunctions. The longer the overheating continues the more damage is done to the apparatus. A malfunction detected immediately may mean only a quick repair but if the overheating continues, the entire machine may be damaged.

Large rotating electrical apparatus is usually cooled with a hydrogen gas stream. The organic compounds in the apparatus are first to be affected by the overheating and they decompose to form particles which enter the gas stream. Monitors then detect particles in the gas stream and sound a warning or shut down the apparatus when too many particles are detected.

Descriptions of such monitors and how they function may be found in U.S. Pat. No. 3,427,880 titled "Overheating Detector For Gas Cooled Electrical Machine" and in U.S. Pat. No. 3,573,460 titled "Ion Chamber For Submicron Particles."Another monitor, "The Condensation Nuclei Detector," is described by F. W. Van-Luik, Jr. and R. E. Rippere, in an article titled "Condensation Nuclei, A New Technique For Gas Analysis," in Analytical Chemistry 34, 1617 (1962) and by G. F. Skala, in an article titled "A New Instrument For The Continuous Detection of Condensation Nuclei," in Analytical Chemistry 35, 702 (1963).

As U.S. Pat. Nos. 3,427,880 and 3,807,218 suggest, special coatings may be applied to the apparatus which decompose and form detectable particles at a lower temperature than the usual organic compounds found in the apparatus. For example, that patent mentions polyalphamethylstyrene, polystyrene, polymethyl methacrylate, and cellulose propionate which decompose to form particles at 230° to 340° C. Unfortunately, since these machines normally operate at about 50° to 100° C, they may be severely damaged by the time the temperature reaches 230° to 340° C.

Efforts to identify materials which will decompose to form detectable particles (i.e., thermoparticulate) at temperatures closer to the operating temperature of the machine have met with several difficulties. Many compounds, such as succinic acid, maleic acid, fumaric acid, and polyacrylic acid, do not decompose below 190° C. Others such as acetic acid, are liquids which boil and therefore are unsuitable. Some compounds, such as oxalic acid, decompose at a low temperature but the decomposition products do not include detectable particles. Compounds such as 1, 2-diformylhydrazine have some of the desirable properties but cannot withstand several years operation at 60° to 100° C. A few compounds contain toxic or corrosive substances in their decomposition products which may render them unsuitable.

SUMMARY OF THE INVENTION

We have found that diazonium salts can be used in a composition to form a thermoparticulating coating which produces detectable particles. The coating can be made compatible with the other organic compounds in the apparatus. The coating is very stable and can withstand several years operation at 60° C without decomposing, yet still produce detectable particles when the temperature reaches about 125° to 180° C (depending on the particular diazonium salt used). Also, when the coating is heated to about the thermoparticulating temperature of the coating it blisters and becomes a very dark brown color which is a considerable aid in locating the malfunction.

DESCRIPTION OF THE INVENTION

A composition is prepared of a diazonium salt in a solution of a resinous carrier. The diazonium salt may be dispersed if it is insoluble in the solvent (e.g., toluene) or it may be in solution if it is soluble in the solvent (e.g., ethyl alcohol or diethyl ether). Dispersions are preferred as they produce much more particulation than do solutions. A particle size of the dispersed diazonium salt of about 25 to about 1000 microns is suitable.

The composition may be prepared by simply mixing the ingredients, but it is preferable to mix the drier, resinous carrier, and solvent first and then add the diazonium salt to prevent the occlusion of the drier in the diazonium salt and thereby to obtain a more homogeneous dispersion of the diazonium salt.

A suitable composition is a resinous carrier, about 20 to about 250 phr (parts by weight per hundred parts of resinous carrier not including solvent) of a diazonium salt, and about 25 to about 75% (by weight based on the resinous carrier) of a solvent for the resinous carrier. If the amount of diazonium salt is less than about 20phr, the quantity of particles given off during decomposition may be too low to be detected by presently-existing detectors. However, the construction of more sensitive detectors would permit a lower amount of diazonium salt. If the amount of diazonium salt exceeds about 250 phr, the composition is thick, difficult to apply, and does not bond well. The preferred amount of diazonium salt, which generally gives the best results, is about 40 to about 60 phr. If the amount of solvent is less than about 25%, the composition is generally too viscous to apply easily and if the amount of solvent is greater than about 75%, the composition is unnecessarily dilute and the coating may be too thin to produce an adequate number of particles during decomposition, at least while the malfunction is highly localized. Best results are usually obtained with about 45 to about 55% solvent.

The composition also preferably contains about 0.1 to about 3 phr of a drier when the resinous carrier is an epoxy resin or similar resin, to promote its room temperature cure. Lead naphthenate or cobalt naphthenate is preferred although stannous octoate, zinc stearate, etc. could also be used. Resins such as polyesters may also require the presence of an organic peroxide as is known in the art. Mixtures of various resins, solvents, or driers are also contemplated.

The thermoparticulating compounds of this invention are diazonium salts which are stable solids at 50° C. The diazonium salt must decompose between about 60° and about 200° C, and produce particles larger than about 25A in order for the particles to be detected with presently-existing monitors. Diazonium salts are compounds containing the group: —N$^+$ ≡ N. Complexed diazonium salts are preferred since they seem to be more temperature stable. A general formula for suitable complexed diazonium salts is 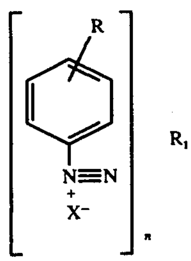 In the formula R is an electron-withdrawing group such as —X or 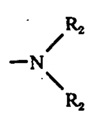 where —X is a halogen group and each $R_2$ is independently selected from alkyl to $C_{20}$, alkylene to $C_{20}$, aryl, alkyl aryl to $C_{20}$, and heterocyclic. Preferably $R_2$ is alkyl to $C_5$ as these compounds are more available. Also, R is preferably in an ortho or para position because these compounds are more stable on aging. Preferably R is halogen as those salts are more stable.

In the formula $R_1$ is the complexed group. This group is preferably a Lewis acid (i.e., and electron acceptor which is not also a proton donor) which will form a stable complex with the salt. Suitable complexed groups are those of the formula $MX_m$ where M is iron, tin, zinc, phosphorus, boron, or antimony, X is halogen, and *m* is an integer from 2 to 5. Preferred complexed groups are $BF_3$, $ZnCl_2$, and $SnCl_4$ as those salts seem to be more temperature stable.

Also, in the formula, $X^-$ is the halogen anion, preferably chlorine, and *n* is an integer from 1 to 2. Mixtures of diazonium salts are also contemplated.

The resinous carrier performs the function of bonding the diazonium salt to the apparatus since a coating of diazonium salt by itself does not adhere well. The resinous carrier should be compatible with the other resins used in the apparatus and therefore it is usually advantageous to use the same resin used elsewhere. The resinous carrier is curable at 60° C and is preferably air-dryable since it cannot be easily cured in place with heat. Also, it should be stable when cured for several years at 60° C. The resin must be unreactive with the diazonium salt for otherwise suitable thermoparticulation will not occur. The diazonium salt and the resin form a mixture and the diazonium salt does not catalyze the cure of the resin. Epoxy resins are preferred as they are usually used elsewhere in the apparatus, but polyester, silicone rubber, styrene, etc. could also be used.

The solvent for the resinous carrier depends on the particular resinous carrier used. Toluene, xylene, benzene, methyl ethyl ketone, ethyl alcohol, diethyl ether, acetone, cellosolve (2-ethoxyethanol) etc. are common solvents that may be used. Toluene is preferred as it is inexpensive and dissolves most resins.

The composition is applied to portions of the electrical apparatus which are exposed to the gas stream. The coating formed does not function as insulation and is usually applied on top of insulation but can also be applied to conductors. The application may be made by painting, spraying, dipping, grease gun, or other techniques. A suitable coating thickness (after drying) is about 1/16 to about ½ inch. The dispersed particles of diazonium salt should not be covered with excessive resinous carrier as that may prevent the decomposition particles from escaping into the gas stream. After evaporation of the solvent and room temperature cure of the resinous carrier, if necessary, apparatus is ready to be operated.

After thermoparticulation and the resulting alarm has occurred a sample of the gas stream can be collected and analyzed. Since different thermoparticulating compounds can be used in different areas of the apparatus and their thermoparticulation products are different, analysis of the sample can pinpoint the location of the overheating.

The following examples further illustrate this invention.

EXAMPLE I

The following composition was prepared using various diazonium salts:

| | Parts by Weight |
|---|---|
| diazonium salt | 100 |
| epoxy resin (50% solids in toluene) made from 200 pbw (parts by weight) linseed fatty acids, 200 pbw styrene, and 300 pbw diglycidyl ether of Bisphenol A, sold by Westinghouse Electric Corporation as "B-276" Varnish (See Example 1 of U.S. Patent 2,909,497 for detailed description) | 100 |
| 6% solution in low boiling hydrocarbons of cobalt naphthenate | 1.0 |
| 24% solution in low boiling hydrocarbons | 0.25 |

-continued

| | Parts by Weight |
|---|---|
| of lead naphthenate | |

| Diazonium Salt | Literature Decomposition Temperature (° C) | Support Material | Concentration in Epoxy (phr)[b] | Additional Heat Treatment | Thermoparticulation Temperature (° C) |
|---|---|---|---|---|---|
| 3-chloro-4-diethyl aminobenzene-diazonium chlorozincate | 113 | Dacron felt | 26.2[a] | None | None |
| | | Copper | 20.0 | 20 days at 80° C | 190* |
| p-diethylamino-benzene-diazonium chlorozincate | 117 | Dacron felt | 40.5[a] | None | None |
| | | Copper | 20.0 | 20 days at 80° C | 190* |
| p-diethylamino-benzene-diazonium fluoroborate | 108 | Dacron felt | 30.8[a] | None | 120 |
| | | Copper | 20.0 | 1 day at 80° C | 125 |
| | | Copper | 20.0 | 20 days at 80° C | 190* |
| 2,5-diethoxy-4-morpholinobenzene diazonium chlorozincate | 120 | Copper | 20.0 | 3 days at 80° C (sample decomposed) | — |
| 4-diethylamino-2-methylbenzene-diazonium chlorozincate | 120 | Copper | 20.0 | 3 days at 80° C (sample decomposed) | — |
| 4-diethylamino-2-ethoxybenzene-diazonium chlorozincate | 140 | Copper | 20.0 | 24 days at 80° C | 180 |
| 4-ethylamino-3-methylbenzene-diazonium chlorozincate | 125 | Copper | 20.0 | 2 days at 80° C (sample decomposed) | — |
| p-amino-N-benzyl-N-ethylbenzene-diazonium chlorostannate | 160 | Copper | 20.0 | 24 days at 80° C | 159 |
| p-dimethylamino-benzene-diazonium chlorozincate | 145 | Copper | 20.0 | 2 days at 80° C (sample decomposed) | — |
| p-chlorobenzene-diazonium pentafluorophosphate | 150 | Dacron felt | 63.5 | None | 110 |
| | | Copper | 20.0 | 3 days at 80° C (sample decomposed) | — |

*probably due to decomposition of epoxy resin.
[a]This figure is the weight % on the Dacron felt - no resin was used.
[b]"phr" includes solvent.

The cobalt and lead naphthenate solutions were added to the epoxy resin prior to the addition of the diazonium salt.

Samples were prepared by brushing the above composition onto 3 inch by 1 inch aluminum and copper sheets 1/16 to ¼ inches thick. The samples were dried to form coating ¼ inches thick, then placed in an oven at 60° or 80° C for various periods to determine if they were stable and would function after aging.

The samples were placed one at a time in a stainless steel boat within a 1 inch stainless steel tube. Hydrogen was passed over the samples at a flow rate of 7 l/min. A phase-controlled temperature regulator and programmer controlled the temperature in the boat. The temperature in the boat was measured by mounting a hot junction chromel-alumel thermocouple within a small hole in the boat. The output of the thermocouple and the detector were monitored on a two-pen potentiostatic recorder. A 5° C/min. heating rate was maintained in each experiment after the insertion of the sample in the boat. The threshold temperature at which considerable particulation occurred was taken from the chart produced by the recorder. The "alarm" temperature at which considerable particulation occurred corresponded to a 50% decrease in the initial ion current of the detector (usually 0.8 to 0.4 mA). The occurrence of particulation was detected using a Generator Condition Monitor or a Condensation Nuclei Monitor. Both instruments are sold by Environment One Corporation.

The following table gives the results.

In the above table chlorozincate is ½ $ZnCl_2$ and the anion used with it is chlorine. Fluoroborate is $BF_3$ and the anion is fluorine. Chlorostannate is ½ $SnCl_4$ and the anion is chlorine. Pentafluorophosphate is $PF_5$ and the anion is fluorine.

The above table indicates that only 4-diethylamino-2-ethoxybenzene-diazonium-chlorozincate and p-amino-N-benzyl-N-ethylbenzene-diazonium chlorostannate were able to withstand 24 hours of aging at 80° C. While the other diazonium salts were not able to withstand aging at 80° C, they are expected to withstand aging at 60° C and thereafter to thermoparticulate, due to the similarity of the molecular structures. However, they would still have utility in those areas of generators which are not subject to temperatures much in excess of 60° C. Such areas include the outside surface of the stator windings at the exciter end of a 2-pole, gas-cooled machine with radial gas flow (i.e., at the "cool" end), the outside surface of the stator windings as the exciter end of a water-cooled, 4-pole machine with axial core ventilation, and on the cool end of the stator coil of a 4-pole, gas-cooled machine with axial core ventilation.

The poor results obtained on copper may be due to the formation of copper oxides which decompose the diazonium salts. This is not considered to be a problem, however, because it is the insulation which is coated in a generator.

EXAMPLE 2

Example 1 was repeated using similar compositions with 100 parts of a diazonium salt and coating on aluminum straps. The compositions containing p-diethylaminobenzene-diazonium fluoroborate and p-amino-N-benzyl-N-ethylbenzene diazonium chlorostannate showed little significant change in their thermoparticulation temperatures even after 200 days of aging at 60° C. Both thermoparticulated between 140° and 160° C.

The composition containing p-chlorobenzene diazonium pentafluorophosphate in a first test gave anomalous results, but in repeat test after 100 days the thermoparticulation temperature had stabilized at 149° to 159° C.

EXAMPLE 3

Compositions were prepared as in Example 1 using 100 parts of a diazonium salt. Each composition was brushed onto copper rectangular blocks (4 × 2¼ × 1½ inches). The coating was allowed to dry overnight at 60°–80° C; total coating build was approximately 10 mils over an area of 31 square inches (end plates not covered).

Each block contained two 650 watt heaters drilled into the copper core; the heaters were connected in parallel (two exit leads). The copper blocks were also equipped with two thermocouples. The blocks were connected to separate inspection plates in two large generators (four sides of block in hydrogen flow); each block being approximately ½ inch from the outer surface of the generators. The generators were a 104 inch diameter by 245 inch long 2-pole, 18KV (690 MVA) machine and a 114 inch diameter by 230 inch long 4-pole, 19KV (707MVA) machine.

In the tests, the coated blocks were externally heated by a source of electrical power. The rate of rise of temperature was controlled to 5° C/minute and the hydrogen was monitored for particulate matter by means of an Environment One Generator Condition Monitor.

The following table gives the results:

| Diazonium Salt | "Alarm" Temperature (° C) | Time Of Run (min.) | Pressure (psi) | Speed (rpm) | Gas Temperature (° C) | Monitor Flow (meter reading) |
|---|---|---|---|---|---|---|
| p-chlorobenzene diazonium hexafluorophosphate | 120–150 | 30 | 75 | 1800 | 46 | 20.0 |
| p-diethylaminobenzene - diazonium fluoroborate | 140–150 | 25 | 60 | 3600 | 40 | 15.0 |

We claim:

1. A method of protecting electrical apparatus from damage due to overheating and for thereafter determining the location of said overheating, said apparatus including a gas stream and a monitor for detecting particles in said gas stream and for emitting a signal when said particles are detected comprising:
   A. preparing a composition which comprises about 20 to about 250 phr of at least one diazonium salt solid and stable at 50° C and a solution of a resinous carrier curable and stable at 60° C and unreactive with said diazonium salt;
   B. applying said composition to said electrical apparatus at positions exposed to said gas stream;
   C. evaporating said solvent and curing said resinous carrier; and,
   D. monitoring said gas stream for the presence of particles therein.

2. A method according to claim 1 including the additional last step of inspecting said apparatus visually for blistered and darkened areas, after a signal has been emitted, to locate the area of overheating.

3. A method according to claim 1 including the additional last step of collecting a sample of said gas stream after a signal has been emitted and analyzing said sample.

4. A method according to claim 1 wherein said diazonium salt is a complex.

5. A method according to claim 4 wherein said diazonium salt complex has the general formula:

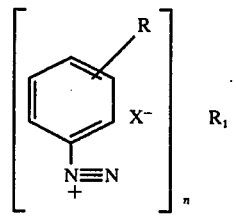

where R is an electron-withdrawing group, $R_1$ is a Lewis acid, $X^-$ is a halogen ion, and $n$ is 1 or 2.

6. A method according to claim 5 wherein R is in an ortho or para position.

7. A method according to claim 5 wherein R is —X or

where —X is halogen and each $R_2$ is independently selected from alkyl to $C_{20}$, alkylene to $C_{20}$, arykl, alkyl aryl to $C_{20}$, and cycloaliphatic.

8. A method according to claim 7 wherein $R_2$ is alkyl to $C_5$.

9. A method according to claim 5 wherein $R_1$ is $MX_m$ where M is iron, tin, or zinc, phosphorus, boron, or antimony, X is halogen, and $n$ is an integer from 2 to 5.

10. A method according to claim 9 wherein $R_1$ is $BF_3$, $ZnCl_2$, or $SnCl_4$.

11. A method according to claim 5 wherein X⁻ is chlorine ion.

12. A method according to claim 5 wherein said complexed diazonium salt is

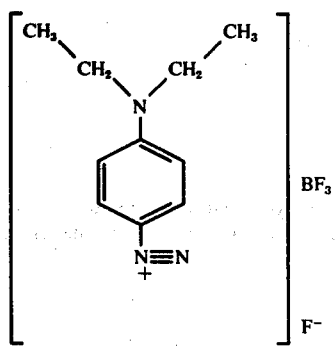

13. A method according to claim 5 wherein said complexed diazonium salt is:

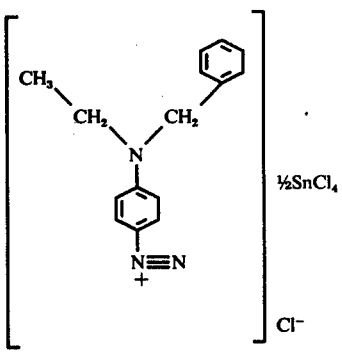

14. A method according to claim 5 wherein said diazonium salt is

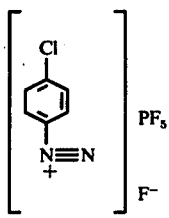

15. A method according to claim 1 wherein the amount of said diazonium salt is about 40 to about 60 phr and the amount of said solvent is about 45 to about 55% (by weight based on said resinous carrier).

16. A method according to claim 1 wherein said resinous carrier is an epoxy resin.

17. A method according to claim 16 which includes about 0.1 to about 3 phr of a drier for said epoxy resin.

18. A method according to claim 17 which is prepared by first mixing said solution of resinous carrier and said drier and then mixing in said diazonium salt.

19. A method according to claim 1 wherein the solvent in said solution is toluene.

20. A method according to claim 1 wherein said diazonium salt is dispersed in said solution.

21. A method according to claim 1 wherein said resinous carrier is air-dryable.

22. A thermal detection system for electrical apparatus cooled by a gas stream comprising (A) a coating of a solid layer of a resinous carrier containing about 20 to about 250 phr of an unreacted diazonium salt which is solid and stable at 50° C, said coating being on a portion of said electrical apparatus exposed to said gas stream and (B) a monitor for detecting the presence of particles in said gas stream.

23. A thermal detection system according to claim 22 wherein said diazonium salt is a complex.

24. A thermal detection system according to claim 23 wherein said diazonium salt complex has the general formula:

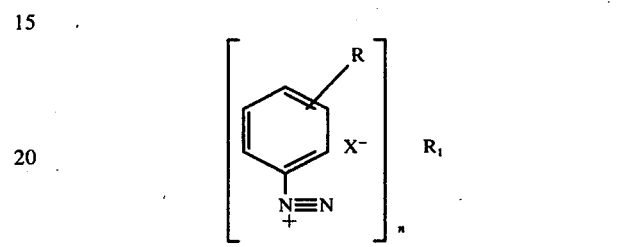

where R is an electron-withdrawing group, R₁ is a Lewis acid, X⁻ is a halogen ion, and $n$ is 1 or 2.

25. A thermal detection system according to claim 24 wherein R is in an ortho or para position.

26. A thermal detection system according to claim 24 wherein R is —X or

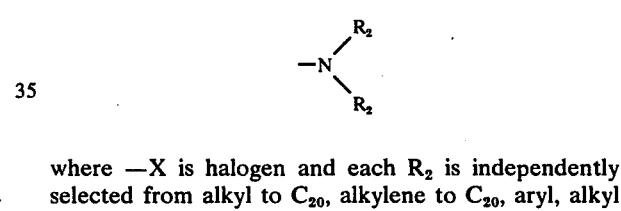

where —X is halogen and each R₂ is independently selected from alkyl to C₂₀, alkylene to C₂₀, aryl, alkyl aryl to C₂₀, and cycloaliphatic.

27. A thermal detection system according to claim 26 wherein R₂ is alkyl to C₅.

28. A thermal detection system according to claim 24 wherein R₁ is MX$_m$ where M is iron, tin, or zinc, phosphorus, boron, or antimony, X is halogen, and $n$ is an integer from 2 to 5.

29. A thermal detection system according to claim 28 wherein R₁ is BF₃, ZnCl₂, or SnCl₄.

30. A thermal detection system according to claim 24 wherein X⁻ is chlorine ion.

31. A thermal detection system according to claim 24 wherein said complexed diazonium salt is

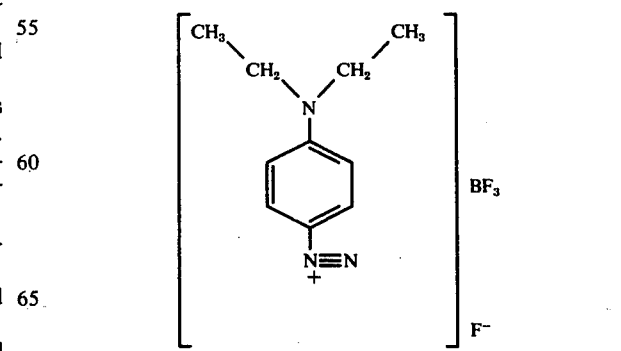

32. A thermal detection system according to claim 24 wherein said complexed diazonium salt is:
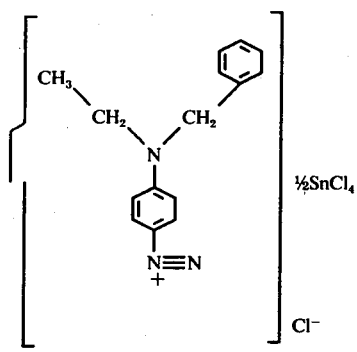
33. A thermal detection system according to claim 24 wherein said diazonium salt is
34. A thermal detection system according to claim 22 wherein said resinous carrier is an epoxy resin.
* * * * *